United States Patent
Chang (10) Patent No.: US 6,656,878 B2
(45) Date of Patent: *Dec. 2, 2003

(54) HIGH CAPACITY ADSORBENT FOR OXYGEN STORAGE AT CRYOGENIC TEMPERATURE

(75) Inventor: Chin-Hsiung Chang, Palatine, IL (US)

(73) Assignee: Honeywell International Inc., Morristown, NJ (US)

( * ) Notice: Subject to any disclaimer, the term of this patent is extended or adjusted under 35 U.S.C. 154(b) by 226 days.

This patent is subject to a terminal disclaimer.

(21) Appl. No.: 09/816,854

(22) Filed: Mar. 23, 2001

(65) Prior Publication Data

US 2001/0019994 A1 Sep. 6, 2001

Related U.S. Application Data

(63) Continuation-in-part of application No. 09/261,046, filed on Mar. 2, 1999, now Pat. No. 6,294,501.
(60) Provisional application No. 60/077,253, filed on Mar. 9, 1998, and provisional application No. 60/077,491, filed on Mar. 11, 1998.

(51) Int. Cl.$^7$ .............................................. C01B 31/00
(52) U.S. Cl. ....................................... 502/416; 502/418
(58) Field of Search .................................. 502/416, 418; 423/445 R (56) References Cited

U.S. PATENT DOCUMENTS

| | | | |
|---|---|---|---|
| 4,786,294 A | | 11/1988 | Jonqueres et al. |
| 4,810,266 A | | 3/1989 | Zinnen et al. |
| 4,985,052 A | | 1/1991 | Haruna et al. |
| 5,071,450 A | | 12/1991 | Cabrera et al. |
| 5,292,706 A | | 3/1994 | Chang et al. |
| 5,599,764 A | | 2/1997 | Sharma et al. |
| 6,087,289 A | | 7/2000 | Choudary et al. |
| 6,106,593 A | | 8/2000 | Golden et al. |
| 6,143,057 A | | 11/2000 | Bülow et al. |
| 6,294,501 B1 | * | 9/2001 | Chang .................. 502/418 |
| 6,300,276 B1 | * | 10/2001 | De Ruiter et al. .......... 502/437 |

* cited by examiner

*Primary Examiner*—Stuart L. Hendrickson
(74) *Attorney, Agent, or Firm*—Oral Caglar, Esq.

(57) ABSTRACT

An oxygen storage adsorbent at cryogenic temperatures that will remove carbon dioxide and water comprises a carbonized precursor material having functional sites that adsorb and store oxygen and that evolve oxygen upon adsorbing carbon dioxide and water. The adsorbent is characterized by a total pore volume of between about 0.5 to 0.6 cm$^3$/g, a median pore diameter between about 0.42 to 0.46 nm, and a BET surface area between about 1000 to 1200 m$^2$/g.

21 Claims, 3 Drawing Sheets

HIGH CAPACITY ADSORBENT FOR OXYGEN STORAGE AT CRYOGENIC TEMPERATURE

CROSS-REFERENCE TO RELATED APPLICATIONS

The present application claims the benefit of U.S. Provisional Application Nos. 60/077,253 and 60/077,491, respectively filed Mar. 9, 1998 and Mar. 11, 1998. This application is also a continuation-in-part of U.S. application Ser. No. 09/261,046 filed Mar. 2, 1999 now U.S. Pat. No. 6,294,501.

BACKGROUND OF THE INVENTION

The present invention generally relates to adsorbents for oxygen, water and carbon dioxide and, more specifically, to an improved adsorbent for the cryogenic storage of oxygen and the simultaneous release of oxygen with removal of carbon dioxide and water from the environment and the release of heat.

Present and future space and underwater explorations require advanced life support systems that are more integrated and have higher volumetric and gravimetric efficiencies. Two essential elements of an advanced life support system are the supply of oxygen and the removal of contaminants, such as carbon dioxide, water, and other potentially harmful trace materials.

Oxygen is an essential gas for the maintenance of human life, especially in space exploration, underwater activities, and underground activities, such as mining. The ability to store and later release oxygen as required to support processes is an important technology.

Carbon dioxide and water are produced from biological processes, combustion of fossil fuels, and from other industrial processes. For the maintenance of human life—especially in space exploration, underwater activities, and underground mining activities—the control of the concentration of carbon dioxide and water are critically important. In addition, carbon dioxide has been identified as one of the global warming gases. There are other trace contaminants, such as $NO_x$, $SO_x$, and $H_2S$, that are removed along with the carbon dioxide and water.

Zeolite materials such as 13X, 4A, and 5A are commonly used adsorbents for storing oxygen and removal of carbon dioxide. These adsorbent materials are inorganic oxides that also adsorb water. These zeolites exhibit a low oxygen capacity of about 30% (weight/weight) at cryogenic temperatures.

Conventional methods of oxygen generation used for respiratory support systems in underwater activities, such as submarines, in space activities, in underground activities and in aircraft activities are based primarily on chlorates, perchlorates, peroxides, and superoxides. The chlorates and perchlorates of lithium, sodium, and potassium evolve oxygen when heated. When these salts are compounded with a fuel, a chlorate-based candle is formed that produces oxygen continuously by thermal decomposition. Large candles capable of delivering 3–4 $m^3$ oxygen in 45 minutes have been used in submarines for long submergence operations. Chlorate candles have also been used in the Apollo moon mission.

In an effort to overcome disadvantages presented by chlorate-based candles and similar systems for the generation of oxygen, carbon-based materials have been used. For example, in U.S. Pat. No. 4,820,681 which is assigned to the assignee of the present invention, a carbon molecular sieve was prepared by polymerizing a cross-linking agent and a precursor monomer to produce a cross-linked polymer. The cross-linked polymer was then shaped into a desired configuration without the need for a binder. The shaped polymer was then carbonized.

In a fashion related to the above patent, U.S. Pat. No. 4,810,266 which is also assigned to the assignee of the present invention discloses a carbon molecular sieve. The sieve is similarly prepared by polymerizing a cross-linking agent and precursor monomer. The cross-linked polymer that is produced was also shaped into a desired configuration and carbonized. The pores of the material were then enlarged by steam treatment. And the material was given an amine functionality that improved capacity upon regeneration of the material by heating.

While the above art has provided some advantages, it has not adequately addressed the importance of adsorbent characteristics such as pore size, micropore volume, and pore size distribution. These characteristics are important because oxygen adsorption and storage on solid adsorbents is based on the interaction forces between the oxygen molecule and the surfaces on the micropores in the adsorbent.

As can be seen, there is a need for an improved adsorbent and storage system for oxygen that overcomes disadvantages of the presently known art.

SUMMARY OF THE INVENTION

In one aspect of the present invention, an oxygen cryogenic storage system adsorbent comprises a carbonized precursor material having first functional sites that adsorb and store oxygen and second functional sites that adsorb water and carbon dioxide and facilitate the release of oxygen, whereby the adsorbent is characterized by a total pore volume of between about 0.5 to 0.6 $cm^3/g$, a median pore diameter between about 0.42 to 0.46 nm, and a BET surface area between about 1000 to 1200 $m^2/g$.

In another aspect of the present invention, a method of making an oxygen adsorbent comprises polymerizing a monomer to produce a precursor material; carbonizing the precursor material to produce a carbonized precursor material; having functional sites that have a high capacity for oxygen and independently adsorbs carbon dioxide, water; and other trace contaminants, whereby the adsorbent is characterized by a oxygen adsorption capacity of about 50 to 70 weight/weight/%, at a pressure of about 10 mmHg, and a temperature of about −186° C. as well as carbon dioxide adsorption capacity between about 30 to 40 weight/weight/%, at a pressure of about 4 mmHg and a temperature of about −80° C., and water adsorption capacity between about 10 to 20 weight/weight/% at a pressure of 25 mmHg and a temperature of about 25° C.

These and other features, aspects and advantages of the present invention will become better understood with reference to the following drawings, description and claims.

DETAILED DESCRIPTION OF THE INVENTION

The present invention can be for various environments, such as those where the atmospheric gases include carbon dioxide, water, and other trace elements and there is insufficient oxygen to support life systems. For example, it may be desirable to release oxygen to the environment and simultaneously remove carbon dioxide and water from enclosed life support systems or vehicles such as submarines, aircraft, and spacecraft. The need to remove carbon dioxide and water from an environment with the introduction of oxygen can also be due to the dictates of industrial or chemical processes that require low levels of carbon dioxide and/or water. Therefore, the present invention can also be useful in generating high-purity oxygen for use in a chemical reaction or analysis.

In general, the present invention provides an enchanced oxygen adsorbent and cryogenic storage system in the form of activated carbon molecular sieves (CMS). The CMS may be thought of as an analog to conventional inorganic molecular sieves and is selective for the separation of one normally gaseous compound or molecule from another. In contrast to the prior art, the adsorbent of the present invention is characterized by, among other things, a total pore volume between about 0.5 to 0.6 cm$^3$/g, a median pore diameter between about 0.42 to 0.46 nm, a BET surface area between about 1000 to 1200 m$^2$/g, and functional sites that adsorb carbon dioxide and/or water independently of enchanced oxygen storage.

A method of making the adsorbent of the present invention may be accomplished by the steps of (1) synthesizing a precursor material by polymerizing a monomer; (2) optionally forming or shaping particles of the precursor material into a desired; (3) carbonizing the shaped material in a substantially oxygen-free environment.

The foregoing is in contrast to the prior art wherein an adsorbent adsorbs both carbon dioxide or water, but does not have the capacity to act as an oxygen storage system. In other words, the functional sites adsorb oxygen at cryogenic temperatures and is released by the adsorption of carbon dioxide and water. Also in contrast to the prior art, the method of the present invention involves a process that achieves an advantageous pore size, pore distribution and surface property that provide maximum effective pore surfaces for the incorporation of functionalities that has an enhanced oxygen storage capacity at cryogenic temperatures with high capacities for $CO_2$ and water vapor. Additionally, the surface characteristics can be altered to remove trace contaminants.

In more specifically describing the steps or acts of the present invention, the monomer used in the synthesizing step may be chosen from a number of different monomers that have characteristics rendering them suitable for the present method. Basically, the monomers should be readily polymerizable, essentially free of oxygen in their molecular structure, and preferably comprised basically of hydrogen, a halogen, and carbon. Among the materials which may be employed as the monomer are vinylidene chloride (VDC), vinyldene fluoride (VDF), vinyl chloride, mixtures of two or more monomers such as mixtures of vinylidene chloride and vinyl chloride, vinylidene chloride and acrylonitrile, and a mixture of vinylidene chloride and chlorotrifluoroethylene. Other suitable monomers include vinyl bromide, chlorinated ethylene, and vinylchlorobenzene. The preferred monomer for utilization in the present invention is vinylidene chloride because of its capability to produce precursor material that forms desirable CMS upon carbonization.

The step or act of polymerizing in the present invention may be performed according to a number of different procedures known in the art. The various types of polymerization referenced herein are defined in accordance with Volume 16 of the Second Edition of the *Kirk-Othmer Encyclopedia of Chemical Technology*. For "suspension polymerization," a monomer is dispersed rather than dissolved in a medium with water being the typical suspension medium. In suspension polymerization, an initiator is dissolved in the monomer, the monomer is dispersed in water, and a dispersing agent is incorporated to stabilize the suspension formed. The monomer droplets are generally on the order of approximately 0.1–1.0 mm in size. In "emulsion polymerization," the polymerization is within a suspended particle of colloidal size of approximately 50 to 1500 Angstroms in diameter. An initiator is normally found in the aqueous phase and not within the monomer.

"Bulk polymerization" is the direct conversion of liquid monomer to polymer in a reaction system in which the polymer remains soluble in its own monomer. To deal with the problems of removing the exothermic heat of polymerization, this type of polymerization is often terminated at relatively low conversions of 40–60% and excess monomer distilled off for use in subsequent polymerization. "Solution polymerization" is where a solvent is used to dissolve the monomer, the polymer, and a polymerization initiator. It is believed that precipitation polymerization and vapor phase polymerization would also be suitable for the subject invention. Preferably, suspension polymerization is used in the present invention because of its relative ease in the control of final precursor particle size, density and other characteristics.

Since it is desired that the produced polymers have a non-oxygen functionality, the polymerization initiator used in the suspension polymerization is preferably an oxygen-free compound. Therefore, a carbon or azo compound— rather than an oxygen-containing initiator—is preferably used. One suitable initiator is 2,2'-azobisisobutyronitrile (AIBN) which has a molecular formula of $C_8H_{12}N_4$. Lauroyl peroxide is also useful. Another suitable polymerization initiator is 2,2'-azobis (2,4-dimethylvaleronitrile) which is available from DuPont Chemical Company and sold under the tradename VAZO 52. The formula of the latter compound is $C_{14}H_{24}N_4$.

If the precursor polymer is produced by solution polymerization, a number of different solvents may be employed. Desired characteristics in the solvent include a high-solubility for the monomer, the absence of oxygen from the molecular structure, and a large difference in boiling point between the solvent and the monomer. Useful solvents include normal hexane, chloroform, carbon tetrachloride, orthodichlorobenzene, and 1,1,2,2,-tetrachloroethane. A weight ratio between monomer and solvent of about 1:1 to 1:2 will normally be suitable.

The preferred suspension polymerization may be carried out in an aqueous solution containing one or more of various dispersing agents such as hydroxypropyl cellulose and hydroxypropyl methyl cellulose. With (AIBN) or lauroyl peroxide being the preferred initiator, the polymerization reaction should be controlled by temperature and agitation at 70–100 rpm to achieve a desired particle size and particle density of the resulting polyvinylidene chloride (PVDC). For example, if AIBN is used, reactor temperature may be increased to about 70° C. and reaction time may be about 8 hours. Thereby, a product yield of about 65% can be obtained. The particle size can be about 20 to 400 micrometers.

With suspension polymerization, several heating steps may preferably be employed, such as: (1) heating the reactor temperature from about 25 to about 53° C. for about 2 to 4 hours; (2) maintaining the temperature at about 48 to 53° C. for 11 to 15 hours; (3) increasing the temperature to about 56 to 60° C. over about 20 to 40 minutes; (4) maintaining the temperature at about 56 to 60° C. for about 5 to 6 hours; (5) increasing the temperature to about 62 to 66° C. over about 20 to 40 minutes; (6) maintaining the temperature at about 62 to 66° C. for about 2 to 3 hours; (7) increasing the temperature to about 68 to 72° C. over 20 to 40 minutes; and (8) maintaining the temperature at about 68 to 72° C. for 1 to 2 hours. More preferably, and with the use of lauroyl peroxide as the initiator, the heating steps may include: (1) heating the reactor temperature from about 25 to about 51° C. over a period of about 2 to 4 hours; (2) maintaining the reactor temperature at about 51° C. for about 13 hours; (3) increasing the temperature to about 58° C. over about 30 minutes; (4) maintaining the temperature at about 58° C. for about 5.5 hours; (5) increasing the temperature to about 64° C. over about 30 minutes; (6) maintaining the temperature at about 64° C. for about 2.5 hours; (7) increasing the temperature to about 70° C. over about 30 minutes; and (8) maintaining the temperature at about 70° C. for about 1.5 hours.

Using the above procedure for lauroyl peroxide to control the polymerization process, a product yield>96% can be obtained. The procedure results in the precursor polymer with maximum particle densities and appropriate polymer structure for preparation of the high capacity adsorbent. The resulting PVDC polymer may then be washed and dried at about 80° C. A particle size of about 20–400 micrometers can be obtained.

Optionally, the polymers produced in the polymerization step may be cross-linked with an oxygen-free cross-linking agent. The cross-linking agent may typically be present during polymerization at a concentration equal to less than about 5.0 mole percent of the monomer. A preferred cross-linking agent is divinylbenzene. Other cross-linking agents which are contemplated for use in the present method include trivinylbenzene and divinyl acetylene.

Whether cross-linked or not, the precursor material formed during the polymerization step may be in a number of different forms, such as one or more large masses or a large number of smaller particles. For ease in fabricating the polymer into a desired shape, the polymer may preferably be ground, pulverized, shredded, or in some way reduced in size to small free-flowing granules or powder. The granules or powder, or even the bulk material resulting from the initial polymerization, may then be shaped or formed into a desired configuration such as a cylinder, sphere, rod, flat sheet, porous or perforated sheet, extruded honeycomb or monolith, pellets, etc. In this embodiment, pellets are preferred. This shaping or forming may be done by conventional means. For instance, the powder may be put into a press and pressurized until it will retain a desired shape. Alternatively, the resultant material may be warmed and extruded into a desired form, such as a cylinder.

Preferably, the precursor material in the form of particles resulting from the suspension polymerization is ground. Grinding may be conducted with dried powder or in a water suspension. The later method is preferred due to the ability of water to serve as a heat sink and to reduce the rise in temperature during grinding. Ice may be added to the suspension in order to further reduce the temperature. Next, it is preferred that the polymer particles of about 4 to 100 micrometers be selected because of ease in fabricating into a desired shape without excessive pressures.

The selected particles may then be pelletized with a commercial pelletization unit without any pelletization aid to hold particles together. A pellet of about 0.05 to 0.20 inches in diameter and about 0.05 to 0.20 inches in length is desired, preferably about 0.08 to 0.15 inches in diameter and about 0.08 to 0.5 inches in length, and more preferably about 0.10 to 0.12 inches in diameter and about 0.10 to 0.12 inches in length. Consequently, a length to diameter ratio is desired between about 0.5 to 2.0, preferably about 0.8 to 1.5, and more preferably about 1.0 to 1.2.

A preferred length to diameter ratio can be advantageous due to needs in placing the final adsorbent with high packing density and low pressure drop in a bed, for example. Because of the requirement to achieve high packing density for the resulting adsorbent, a preferred pellet density is desired between about 0.5 to 1.5 g/cm$^3$, preferably about 0.8 to 1.4 g/cm$^3$, and more preferably about 0.9 to 1.2 g/cm$^3$. The pellet density may be controlled by adjusting the amount of powder and/or a pelletization pressure.

If in a shaped form—whether in pellets or otherwise—the shaped precursor material may desirably be between about 0.020 to 0.036 grams, preferably between about 0.024 to 0.034 grams, and more preferably between about 0.026 to 0.032 grams. The weight of the shaped precursor material can be important due to the need for producing carbonized adsorbent with the highest density while maintaining an optimum pore size and pore size distribution.

The shaped or unshaped precursor material may then subjected to a carbonization procedure. The carbonization temperature—as well as the precursor material particle size, particle size distribution, and piece density—determine the final CMS pore size, pore size distribution, and mechanical strength. This carbonization procedure may basically include heating the precursor material in a stepped fashion to a high temperature in the presence of an inert gas such as nitrogen or helium. This carbonization may be performed in an essentially oxygen-free environment. That is, the concentration of oxygen in the atmosphere surrounding the particles undergoing carbonization should be less than about 0.5 percent and preferably less than about 0.1 mole percent. The carbonization will result in the evolution of a hydrogen halide with halogen-containing precursors. Preferably, flowing inert gas is used at a sufficient rate to remove this material from the particles. However, it has been found that the removal of the hydrogen halide is not necessary to the production of suitable finished material by the subject method.

The shaped or unshaped precursor material may then be preferably subjected to a stepped temperature increase to a high carbonization temperature of at least about 750° C. and preferably to about 860° C. over a period of about 3 to 8 hours. As such, the temperature of the precursor material may be raised in temperature at a rate of about 50 to 200° C. per hour. Preferably, it is raised at about 80 to 100° C. per hour. Also, it is desirable to hold the precursor material at the final high carbonization temperature from about 2.0 to 8.0 hours and preferably for about 3.0 to 5.0 hours. The required holding period can be determined by weight loss measurements, i.e., until no further weight loss occurs.

The heating process decomposes the polymer precursor and forms the adsorbent structure. The rate of the elimination of hydrogen halides and the growth of the adsorbent pore structure depend on the temperature and the rate the temperature is increased. With the proper heating step, an adsorbent material can be prepared with an adequate pore structure and an enhanced mechanical strength.

In a more specific embodiment, for example, where the precursor material is synthesized with lauroyl peroxide as the initiator and pellets are prepared with ground 20–60 microns powder, the carbonization step may include: (1) heating from about 25 to about 200° C. in about 3 hours, (2) holding the temperature at about 200° C. for about 5.0 hours, (3) raising the temperature from about 200 to about 860° C. in about 6.6 hours, (4) holding the temperature at about 860° C. for about 5.0 hours, and (5) lowering the temperature from about 860 to 25° C. in about 3.0 hours.

The carbonized precursor material may be characterized by a weight between about 0.0050 to 0.0090 grams, preferably between about 0.0060 to 0.0086 grams, and more preferably between about 0.0066 to 0.0081 grams. The weight of the carbonized precursor material can be important due to the advantageous packing density and total pore volume. The carbonized precursor material may also be characterized by a BET surface area between about 800 to 1400 m$^2$/g, preferably between about 900 to 1300 m$^2$/g, more preferably between about to 1000 to 1200 m$^2$/g, and specifically at about 1100 m$^2$/g. A total pore volume between about 0.40 to 0.70 cm$^3$/g, more preferably between about 0.45 to 0.65 cm$^3$/g, as well as a mean pore diameter between about 0.40 to 0.50 nm, preferably between about 0.41 to 0.48 nm, more preferably between about 0.42 to 0.46 nm, and specifically about 0.44 nm may also characterize the carbonized precursor material. The carbonized precursor material may be also characterized by a packing density between about 0.50 to 0.90 g/cm$^3$, preferably between about 0.55 to 0.85 g/cm$^3$, more preferably between about 0.60 to 0.80 g/cm$^3$/.

Typically carbonaceous adsorbents, including activated carbons and carbon molecular sieves, are bound by other binder materials to form extrudates or pellets. These binders do not contribute to the adsorptive or storage capacity of the resulting adsorbent. The adsorbent with a high surface area, low pore diameter and high pore volume is generally low in packing density. Unexpectedly the adsorbent disclosed in this invention is high in high packing density while maintaining high surface area, high pore volume, and low pore diameter.

A shaped mass of polymeric precursor material can shrink during the carbonization step. The shrinking will tend to occur in a proportional manner along each dimension. The amount of shrinkage is also proportional to the amount of weight loss caused by the driving off of the hydrogen halide from the shaped polymer precursor material. The shaped pellet can lose approximately 70 percent of its weight and size during the carbonization procedure due to the evolution of hydrogen chloride, hydrogen bromide, or hydrogen fluoride or a mixture of these gases.

If no specific shape is desired, the shaping step may be deleted and particles of a desired size may be carbonized, as mentioned above. Alternatively, large masses of polymer may be carbonized and then crushed and sized, such as with screens, although this procedure generally results in the production of considerable waste in the form of off-size particles.

Figure 1:
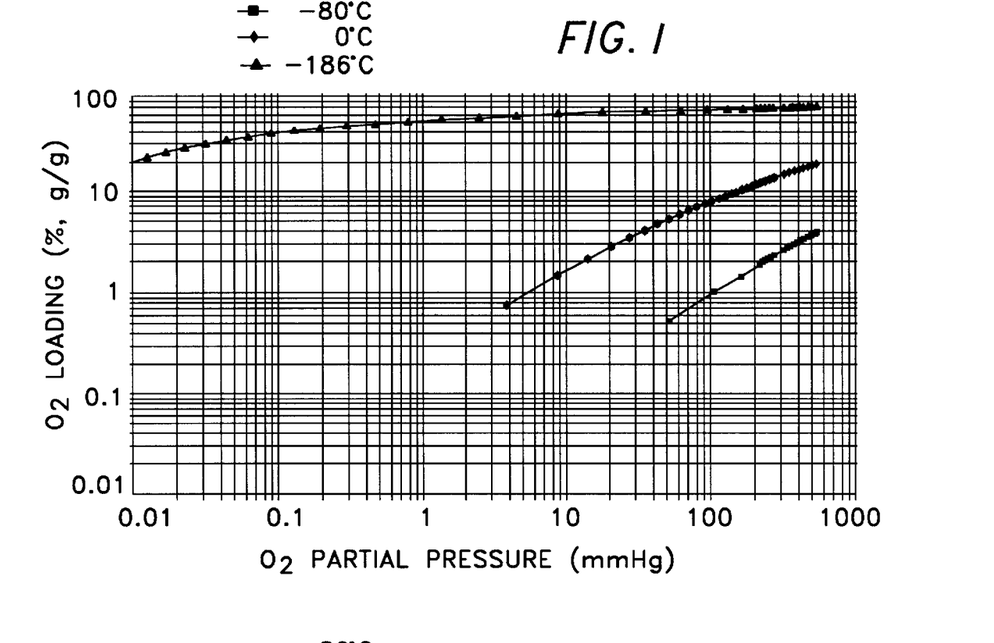
FIG. 1 is oxygen adsorption isotherms for carbon molecular sieve (CMS) at cryogenic temperatures in accordance with the present invention.
Figure 4:
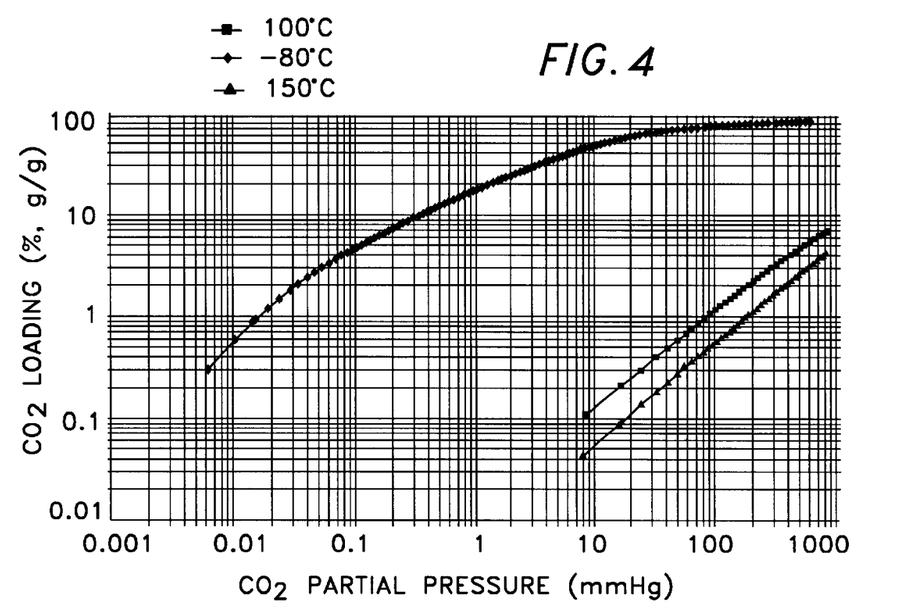
FIG. 4 is carbon dioxide adsorption isotherms for carbon molecular sieve at cryogenic and elevated temperatures in accordance with the present invention.

As a consequence of the foregoing steps, the final CMS or adsorbent of the present invention has a oxygen adsorption capacity—at a temperature between about –180 to –190° C. and a pressure between about 1 to 200 mmHg of at least about 50% and extending up to about 70% (wt./wt.). At a temperature of –80° C. and a pressure between 1 to 5 mmHg, the adsorbent also has a carbon dioxide adsorption capacity of at least about 18% and extending up to about 40% (wt./wt.). The adsorbent has a water adsorption capacity of at least about 10% and extending up to about 30% (wt./wt.) at 25° C. and a water pressure of 25 mmHg. This is depicted in FIGS. 1 and 4 which are oxygen and carbon dioxide adsorption isotherms respectively measured for adsorbent of the present invention.

Figure 2:
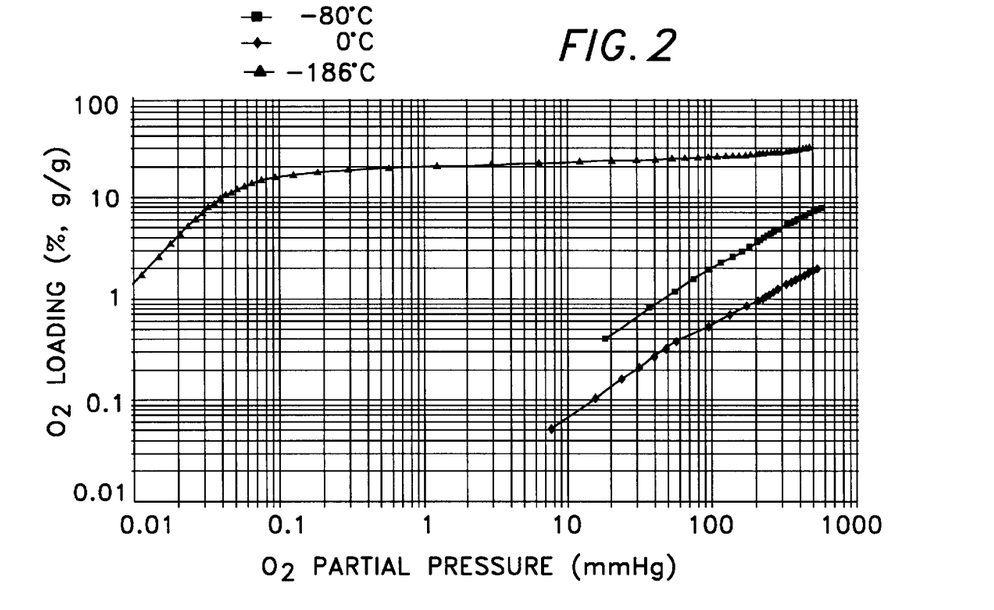
FIG. 2 is oxygen adsorption isotherms for UOP 4A zeolite molecular sieve at cryogenic temperatures.
Figure 3:
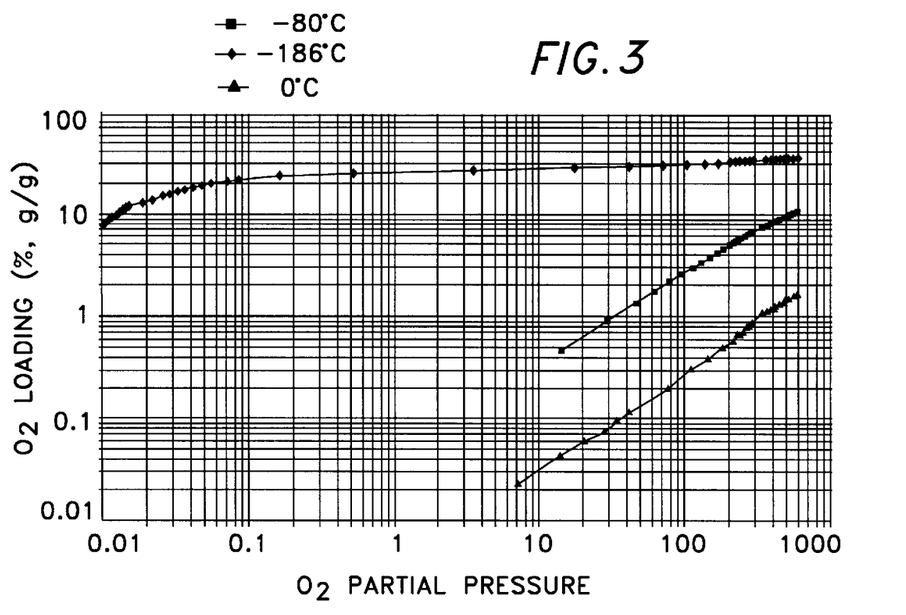
FIG. 3 is oxygen adsorption isotherms for UOP 5A zeolite molecular sieve at cryogenic temperatures.

For purposes of comparison, FIGS. 2 and 3 depict the oxygen storage and adsorption capacity of the zeolite materials 4A and 5A respectively at three temperatures from about –186° C. to about 0° C. In both cases the oxygen adsorption capacity at a temperature between about –80 to –186° C. and a pressure between 1 to 200 mm Hg is at least about 20% and extending up to about 30% (wt./wt.)

The bifunctional nature of the CMS prepared according to the present invention allows oxygen to be stored and released as well as carbon dioxide removal to be achieved without the prior passage of environmental air being treated for the removal of normally expected amounts of water vapor. The oxygen release with the concurrent adsorption of carbon dioxide removal with heat generation from the environment may be accomplished by passing the air at a slight pressure or at an ambient pressure through an active bed of the CMS and at adsorption-promoting conditions. The adsorbed carbon dioxide and or water vapor may then be recovered from the CMS by conventional means such as by depressurization, heating, or a combination of these two methods which regenerates the material and returns it to an active or unsaturated form.

EXAMPLE 1

For the synthesis of a PVDC precursor, 140.6 g (107.1 ml.) of a commercial vinylidene chloride(VDC) was contacted with 40 ml. of PCB activated carbon (20×50 mesh) to remove the inhibitor present in the VDC. 2,2'-azobisisobutyronitrile (AIBN), 0.141 g., is dissolved in this inhibitor-free VDC. Separately an aqueous solution of 5 g. of hydroxypropyl methylcellulose in 811.3 g. of distilled water (DI) was prepared in a one gallon glass lined reactor. The initiator solution and additional VDC (inhibitor removed) were prepared having a total of 140.74 grams of VDC and were mixed with 703.3 g. of the aqueous solution in the reactor with a mixer maintained at 70 rpm.

The temperature of the reactor was increased to 70° C. and held at temperature for 8 hours. The pressure was increased to 30 psig. A yield of 65% with particle sizes ranging from 200 to 800 micrometers was obtained.

EXAMPLE 2

For the synthesis of a PVDC precursor, an aqueous solution was prepared by dissolving 50.0 g of Methocel (hydroxypropyl methylcellulose) in 101,070 g of DI water in a 50-gallon reactor. A catalyst initiator solution was prepared by dissolving 102.2 g of lauroyl peroxide in one liter of VDC (inhibitor removed). The initiator solution and additional VDC (inhibitor removed) was prepared to have a total of 40,870 grams of VDC mixed with the aqueous solution in the 50-gallon reactor with a mixer maintained at 75 rpm.

A reaction temperature program described above was used. A total of 39,662 grams of PVDC with particle sizes ranging from 20 to 400 micrometers was obtained.

EXAMPLE 3

For the pelletization and shaping of the PVDC powder, the PVDC precursor produced as described in Example 1 was ground in a commercial grinder in solid form. This resulted in a narrow particle size distribution of 20–60 micrometers. The fine powder was pelletized in a commercial pelletization unit to the following geometry and piece density shown in Table 1:

TABLE 1

Precursor Pellet

| Pellet # | Diameter (mm) | Length (mm) | Weight (g) | Density (g/cm$^3$) |
|---|---|---|---|---|
| 1 | 3.200 | 3.08 | 0.0258 | 1.04 |
| 2 | 3.200 | 3.05 | 0.0257 | 1.05 |
| 3 | 3.180 | 3.08 | 0.0263 | 1.08 |
| 4 | 3.110 | 3.11 | 0.0269 | 1.14 |
| 5 | 3.200 | 3.02 | 0.0256 | 1.05 |
| 6 | 3.180 | 3.11 | 0.0258 | 1.04 |
| 7 | 3.150 | 3.02 | 0.0257 | 1.09 |
| 8 | 3.150 | 2.95 | 0.0255 | 1.11 |
| 9 | 3.110 | 3.00 | 0.0253 | 1.11 |
| 10 | 3.15 | 3.04 | 0.0252 | 1.08 |
| Average | 3.16 | 3.04 | 0.0258 | 1.081 +/− 0.032 |

EXAMPLE 4

Following the general procedures of Example 3, the PVDC precursor produced was ground in a liquid suspension. 520 grams of PVDC were first mixed with 300 ml of DI water and ground for 20 minutes. A cooling time of 20 minutes was used and then 150 ml of ice were added to the mixture and ground for another 20 minutes. The process was repeated for a total of 8 times. After a total grinding of 180 minutes, the mixture was dried in air. This resulted in a narrow particle size distribution of 20–60 micrometers. The fine powder was pelletized in a commercial pelletization unit to the following geometry and piece density shown in Table 2.

TABLE 2

Precursor Pellet

| Pellet # | Diameter (mm) | Length (mm) | Weight (g) | Density (g/cm$^3$) |
|---|---|---|---|---|
| 1 | 3.290 | 3.50 | 0.0356 | 1.10 |
| 2 | 3.300 | 3.44 | 0.0310 | 1.05 |
| 3 | 3.260 | 3.28 | 0.0300 | 1.10 |
| 4 | 3.260 | 3.30 | 0.0322 | 1.17 |
| 5 | 3.230 | 3.12 | 0.0305 | 1.19 |
| 6 | 3.240 | 3.16 | 0.0298 | 1.14 |
| 7 | 3.300 | 3.30 | 0.0314 | 1.11 |
| 8 | 3.190 | 3.29 | 0.0304 | 1.16 |
| 9 | 3.220 | 3.23 | 0.0315 | 1.20 |
| 10 | 3.210 | 3.39 | 0.0299 | 1.09 |
| Average | 3.250 | 3.30 | 0.0312 | 1.131 +/− 0.048 |

EXAMPLE 5

The PVDC precursor pellets prepared as described in Example 3 were carbonized in a 3-inch tubular furnace. A quartz boat of 6-cm wide and 36-cm long was placed in a quartz tube of 7-cm diameter. A total of 250.2 grams of the PVDC pellets were carbonized in a flow of nitrogen at a flow rate of 630 cm$^3$/min, with the nitrogen flow passing through two scrubbers containing water and 20% KOH, respectively. A temperature program was followed as shown below:

1. Increase temperature from 25° C. to 200° C. in 3.0 hours;
2. Hold the temperature at 200° C. held for 5.0 hours,
3. Increase the temperature from 200 to 860° C. in 6.6 hours;
4. Hold the temperature at 860° C. held for 5.0 hours;
5. Decrease the temperature from 860° C. to 25° C. in 3.0 hours;

After the temperature was cooled down, 63.8 grams of carbon molecular sieve were obtained with a yield of 25.5%. The geometry and piece density of the carbon molecular sieve is shown below in Table 3:

TABLE 3

Carbonized Precursor Pellet

| Pellet # | Diameter (mm) | Length (mm) | Weight (g) | Density (g/cm$^3$) |
|---|---|---|---|---|
| 1 | 2.23 | 2.36 | 0.0077 | 0.835 |
| 2 | 2.23 | 2.28 | 0.0076 | 0.853 |
| 3 | 2.21 | 2.12 | 0.0072 | 0.885 |
| 4 | 2.22 | 2.10 | 0.0070 | 0.861 |
| 5 | 2.20 | 2.43 | 0.0079 | 0.855 |
| 6 | 2.18 | 2.20 | 0.0064 | 0.779 |
| 7 | 2.21 | 2.02 | 0.0065 | 0.839 |
| 8 | 2.18 | 2.38 | 0.0081 | 0.912 |
| 9 | 2.23 | 2.35 | 0.0083 | 0.904 |
| 10 | 2.25 | 2.25 | 0.0084 | 0.939 |
| Average | 2.21 | 2.25 | 0.0075 | 0.866 +/− 0.046 |

EXAMPLES 6–15

Following a general procedure of Example 5, a number of carbonization runs were conducted in the laboratory. Results of these runs are summarized as shown in Table 4.

TABLE 4

Carbonized Precursor Pellets

| Example | PVDC pellets (grams) | CMS product (grams) | Carbonization yield (%) |
|---|---|---|---|
| 6 | 251.7 | 63.6 | 25.27 |
| 7 | 262.4 | 66.5 | 25.34 |
| 8 | 265.3 | 67.3 | 25.37 |
| 9 | 352.6 | 89.2 | 25.30 |
| 10 | 351.8 | 83.8 | 25.26 |
| 11 | 373.1 | 94.2 | 25.25 |
| 12 | 345.6 | 86.5 | 25.03 |
| 13 | 365.4 | 93.9 | 25.70 |
| 14 | 328.6 | 83.0 | 25.26 |
| 15 | 345.3 | 87.1 | 25.22 |

The yield refers to the amount of material remaining following carbonization that results in thermal decomposition.

EXAMPLES 16

Oxygen adsorption isotherms for the CMS materials prepared from Examples 5–15 were measured with a Micromeritics adsorption instrument (ASAP 2000). The Micromeritics ASAP 2000 is a volumetric instrument that provides accurate measurement on the equilibrium capacities of the adsorbent material for the storage of oxygen at cryogenic temperatures.

In preparation for measurement with the Micromeritics ASAP 2000 instrument about 0.3 g. of the CMS were heated to about 80° C. for a period of about 24 hours. The CMS was placed in the sample cell which had a calibrated free space of about 17.27 ml. Under STP a low pressure amount of about 1.00 mL/g. of oxygen was introduced into the sample cell. A final pressure of oxygen was measured after equilibrium was obtained, typically after about 45 seconds. The change in pressure with a constant volume was used to calculate the amount of oxygen adsorbed under the testing conditions.

The evaluation of the CMS as prepared in Example 5 is depicted in FIG. 1 which illustrates the oxygen adsorption isotherms measured at −186, −80 and 0° C.

EXAMPLE 17

Following the general procedure of Example 16, oxygen adsorption isotherms were measured for a commercial molecular sieve zeolite 4A from UOP. These isotherms are depicted in FIG. 2 and show that the oxygen storage capacities of the commercial zeolite 4A are lower as compared to the CMS material disclosed in this invention.

EXAMPLE 18

Following the general procedure of Example 16, oxygen adsorption isotherms were measured for a commercial molecular sieve zeolite 5A from UOP. These isotherms are depicted in FIG. 3 and show that the oxygen capacities of the commercial zeolite 5A from UOP are lower as compared to the CMS material disclosed in this invention.

EXAMPLE 19

Following the general procedure described in Example 16, carbon dioxide adsorption isotherms were measured for the CMS prepared in Example 5. These isotherms, depicted in FIG. 4, illustrate the capability of the oxygen storage CMS to remove carbon dioxide at −80°, 100° and 150° C.

EXAMPLE 20

Following the general procedure of Example 16, oxygen adsorption isotherms were measured at 25° C. for two CMS from commercial sources. Table 5 is a comparison of the adsorption capacity for each source and for the CMS prepared in Example 5. The CMS of the present invention exhibited twice the oxygen capacity at 25° C. of the two available commercial materials.

TABLE 5

Comparison of CMS with Commercial CMS

| Carbon Molecular Sieve | Oxygen Capacity at 600 mm Hg, 25° C. |
|---|---|
| CMS (Example 5) | 0.62 |
| Shirasagi CMS, 3A | 0.31 |
| Kaldair CMS | 0.14 |

EXAMPLE 21

A cryogenic testing unit was established in the laboratory for the evaluation of the CMS for selective carbon dioxide removal under oxygen storage conditions. The unit consisted of a cryogenic temperature bath, a test vessel with an internal temperature probe, gas supply with various test gas mixtures and oxygen and carbon dioxide gas monitors. A CMS sample prepared as in Example 5 of about 30 g. was loaded into the test vessel. The CMS material was heated to 200° C. under vacuum to remove any material originally adsorb on the CMS. After 15 hours the test vessel was cooled to room temperature of about 22° C. and then cooled to cryogenic temperatures from about −60 to −80° C. When the vessel reached the desired temperature, a gas mixture of 30% $O_2$ in He and 30% $O_2$–0.5% $CO_2$ in He was introduced into the vessel at a rate of about 60 $cm^3$/min and the effluent concentration of either oxygen or carbon dioxide was monitored continuously.

Figure 5:
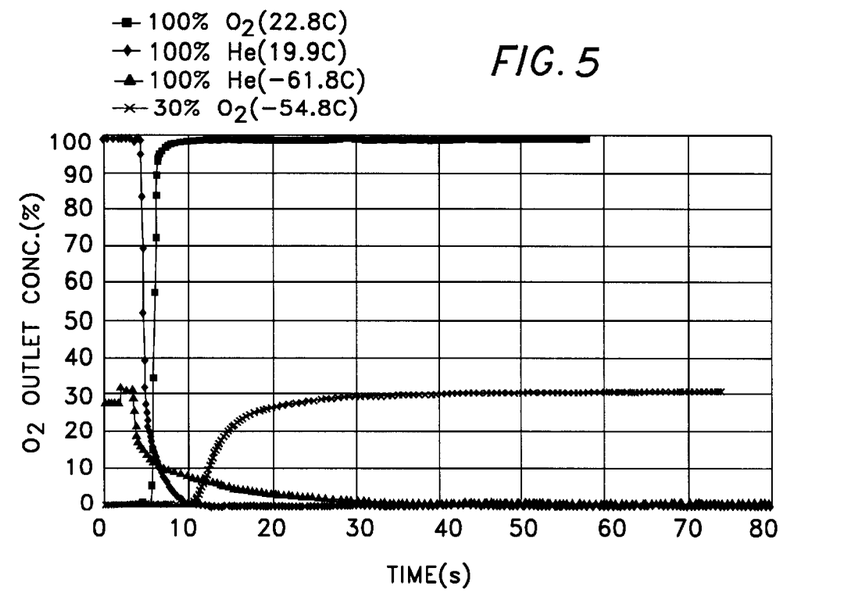
FIG. 5 is a graph of the co-adsorption of oxygen and helium on CMS varying temperatures in accordance with the present invention.

The adsorption of oxygen with 100% oxygen gas at about 22.8° C. and the replacement of the oxygen with helium with 100% helium at about 19.9° C. is depicted in FIG. 5. The figure also illustrated the adsorption and storage of oxygen at about −54.8° C. with a gas supply of 30% oxygen in helium.

Figure 6:
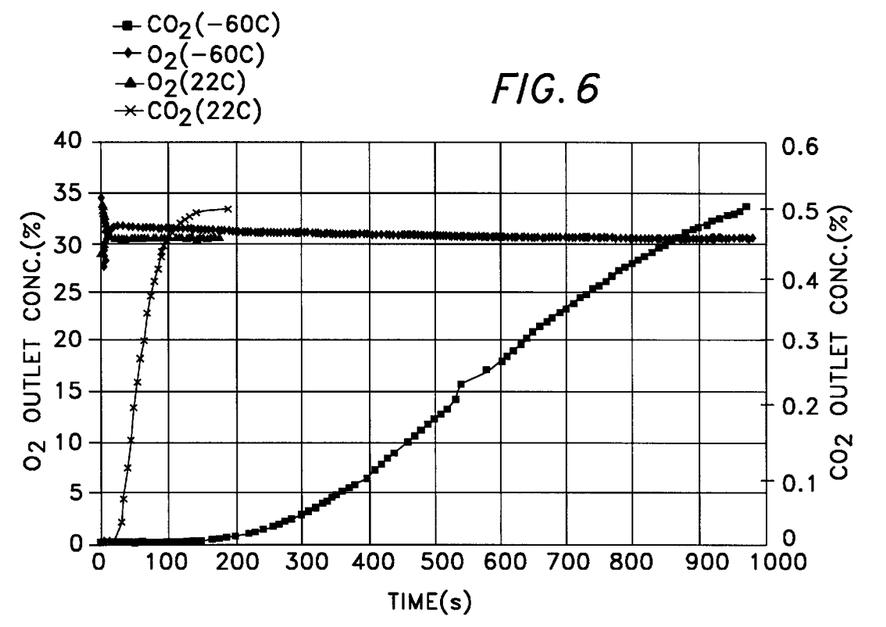
FIG. 6 is a graph of the exchange of oxygen and carbon dioxide at −60° C. and 22° C. for the CMS shown in FIG. 5 in accordance with the present invention.

When the gas supply of 30% oxygen in helium is used at about 22° C. and at about −60° C. the CMS prepared in Example 5 first adsorbed oxygen. Changing the gas supply to one containing 30% oxygen and 0.5% carbon dioxide in helium at about 22° C. and at about −60° C., the oxygen was evolved and the carbon dioxide was absorbed which was shown by an oxygen concentration that was higher than 30% in the effluent. This is illustrated in FIG. 6.

It should be understood, of course, that the foregoing relates to preferred embodiments of the invention and that modifications may be made without departing from the spirit and scope of the invention as set forth in the following claims.

I claim:

1. An oxygen storage adsorbent, comprising:
   a carbonized precursor material having functional sites that adsorb said oxygen, said precursor material being characterized by a diameter between about 0.08 to 0.10 inches, a length between about 0.08 to 0.10 inches, a weight between about 0.006 to 0.008 grams, a piece density between about 0.8 to 1.1 $g/cm^3$, a median pore diameter between about 0.42 to 0.46 nm, and a chemical structure essentially free from oxygen atoms.

2. The adsorbent of claim 1, wherein said carbonized precursor material is further characterized by total pore volume of between about 0.5 to 0.6 $cm^3$/g.

3. The adsorbent of claim 1, wherein said carbonized precursor material is further characterized by a BET surface area between about 1000 to 1200 $m^2$/g.

4. The adsorbent of claim 1, wherein said adsorbent is characterized by a oxygen adsorption capacity between about 50 to 70 wt./wt. % at a temperature of about −180 to −190° C. and a pressure of about 1 to 200 mm Hg.

5. The adsorbent of claim 1, wherein said adsorbent is characterized by a carbon dioxide adsorption capacity between about 18 to 40 wt./wt. % at a temperature of about −75 to −85° C. and a pressure of about 1 to 5 mm Hg.

6. A oxygen storage adsorbent, comprising:
   a carbonized precursor material having sites that adsorb oxygen and evolve said oxygen upon adsorbing carbon dioxide and water,
   whereby said adsorbent is characterized by a total pore volume of between about 0.5 to 0.6 $cm^3$/g, a median pore diameter between about 0.42 to 0.46 nm, and a BET surface area between about 1000 to 1200 $m^2$/g; and
   whereby said carbonized precursor material has a chemical structure essentially free from oxygen atoms.

7. The adsorbent of claim 6, wherein said carbonized precursor material is further characterized by a diameter between about 0.08 to 0.10 inches.

8. The adsorbent of claim 6, wherein said carbonized precursor material is further characterized by a length between about 0.08 to 0.10 inches.

9. The adsorbent of claim 6, wherein said carbonized precursor material is further characterized by a weight between about 0.006 to 0.008 grams.

10. The adsorbent of claim 6, wherein said carbonized precursor is further characterized by a packing density between about 0.6 to 0.8 g/cm$^3$.

11. The adsorbent of claim 6, wherein said carbonized precursor material is further characterized by total pore volume of between about 0.5 to 0.6 cm$^3$/g.

12. The adsorbent of claim 6, wherein said carbonized precursor material is further characterized by a median pore diameter between about 0.42 to 0.46 nm.

13. A method of making a oxygen storage adsorbent, comprising:

polymerizing a monomer to produce a precursor material;

carbonizing said precursor material to produce a carbonized precursor material;

whereby said adsorbent is characterized by a oxygen adsorption capacity between about 50 to 70 wt./wt. %, as well as a carbon dioxide adsorption capacity between about 18 to 40 wt./wt. %, at a pressure of about 1 to 5 mm Hg for $CO_2$ 25 mm Hg for water, and a temperature of about −80 to −190° C.;

whereby said adsorbent is further characterized by a median pore diameter between about 0.42 to 0.46 nm.

14. An oxygen storage adsorbent made according to the process of claim 13.

15. The method of claim 13, wherein said carbonized precursor material is characterized by a diameter between about 0.08 to 0.10 inches.

16. The adsorbent of claim 13, wherein said carbonized precursor material is characterized by a length between about 0.08 to 0.10 inches.

17. The adsorbent of claim 13, wherein said carbonized precursor material is characterized by a weight between about 0.006 to 0.008 grams.

18. The adsorbent of claim 13, wherein said carbonized precursor material is characterized by a piece density between about 0.8 to 1.1 g/cm$^3$.

19. The method of claim 13, wherein said adsorbent is further characterized by a total pore volume between about 0.5 to 0.6 cm$^3$/g.

20. The oxygen storage adsorbent according to claim 14, wherein said carbonized precursor material is characterized by a diameter between about 0.08 to 0.10 inches, a weight between about 0.006 to 0.008 grams, a piece density between about 0.8 to 1.1 g/cm$^3$, and a total pore volume between about 0.5 to 0.6 cm$^3$/g.

21. The method of claim 13, wherein said adsorbent is further characterized by a BET surface area between about 1000 to 1200 m$^2$/g.

\* \* \* \* \*